United States Patent
Brittan et al.

(10) Patent No.: US 9,250,340 B2
(45) Date of Patent: Feb. 2, 2016

(54) METHODS AND APPARATUS FOR AUTOMATED NOISE REMOVAL FROM SEISMIC DATA

(75) Inventors: John Brittan, Weybridge (GB); Paul Lecocq, West Ealing (GB); Andrew Wrench, Surbiton (GB)

(73) Assignee: PGS Geophysical AS, Oslo (NO)

(*) Notice: Subject to any disclaimer, the term of this patent is extended or adjusted under 35 U.S.C. 154(b) by 876 days.

(21) Appl. No.: 13/406,989

(22) Filed: Feb. 28, 2012

(65) Prior Publication Data

US 2013/0226462 A1 Aug. 29, 2013

(51) Int. Cl.
*G01V 1/36* (2006.01)

(52) U.S. Cl.
CPC .............. *G01V 1/36* (2013.01); *G01V 2210/32* (2013.01); *G01V 2210/3246* (2013.01); *G01V 2210/3248* (2013.01); *G01V 2210/56* (2013.01)

(58) Field of Classification Search
USPC ........... 702/14, 16, 17; 367/24, 43, 46, 47, 49
See application file for complete search history.

(56) References Cited

U.S. PATENT DOCUMENTS

| | | | |
|---|---|---|---|
| 4,204,279 A | 5/1980 | Parrack et al. | |
| 5,265,192 A | 11/1993 | McCormack | |
| 6,128,580 A * | 10/2000 | Thomsen | 702/18 |
| 6,148,264 A | 11/2000 | Houck et al. | |
| 6,691,039 B1 * | 2/2004 | Wood | 702/17 |
| 2004/0233782 A1 | 11/2004 | Herkenhoff et al. | |
| 2007/0030760 A1 | 2/2007 | Laake | |
| 2009/0171588 A1 * | 7/2009 | Beasley | G01V 1/364 702/17 |
| 2010/0299070 A1 * | 11/2010 | Abma | 702/14 |
| 2011/0317521 A1 | 12/2011 | Dragoset, Jr. et al. | |
| 2012/0163122 A1 * | 6/2012 | Ozdemir | G01V 1/364 367/24 |
| 2012/0250460 A1 * | 10/2012 | Edme | G01V 1/364 367/45 |
| 2013/0226462 A1 * | 8/2013 | Brittan | G01V 1/36 702/17 |
| 2014/0324357 A1 * | 10/2014 | Halliday | G01V 1/20 702/17 |

OTHER PUBLICATIONS

Douglas G. Martinson, et al. "NonLinear Seismic Trace Interpolation", Jan. 1992, pp. 136-145, Geophysics, vol. 57, No. 1.
R.E. White "The Estimation of Signal Spectra and Related Quantities by Means of the Multiple Coherence Function", May 1972, pp. 660-703, Paper read at the Thirty-fourth Meeting of the European Associate of Exploration Geophysicists.
European Search Report mailed Feb. 5, 2015, in the prosecution of patent application MXL00719EP, 4 pages.

* cited by examiner

*Primary Examiner* — John Breene
*Assistant Examiner* — Jeffrey Aiello

(57) ABSTRACT

Methods and apparatus for noise removal from seismic data. In one embodiment, a seismic data set comprising a plurality of traces is received, and noise metrics for the seismic data set are computed using a set of time and depth windows. The seismic data set is scanned to determine a first set of groups. Each group in the first set comprises at least a first minimum number of neighboring traces for which at least one of the noise metrics is outside a predefined specification. Noise attenuation is applied to the traces in the first set of groups. Other embodiments, aspects, and features are also disclosed.

19 Claims, 11 Drawing Sheets

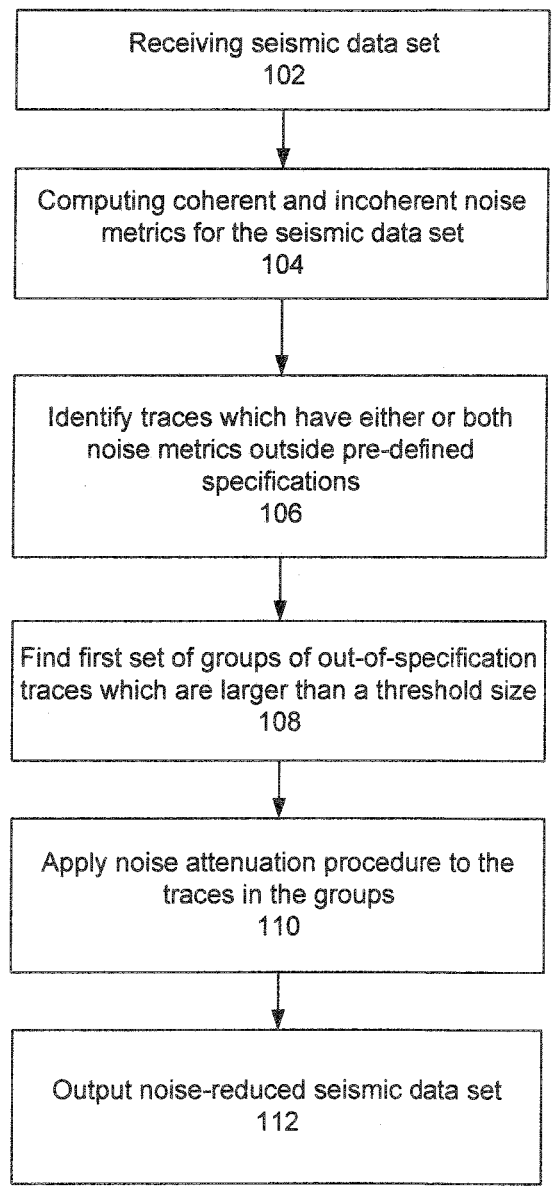
FIG. 1          100

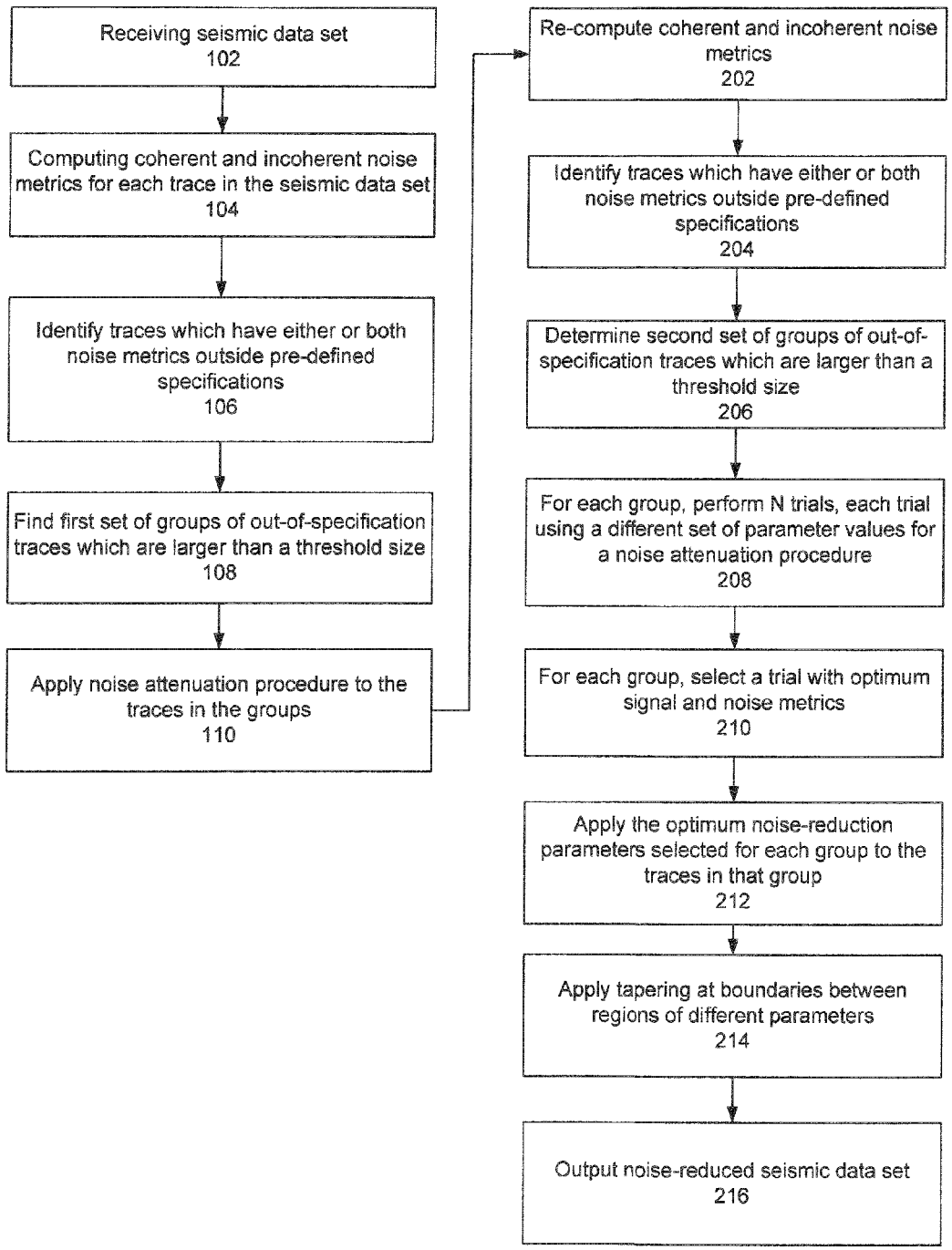
FIG. 2     200

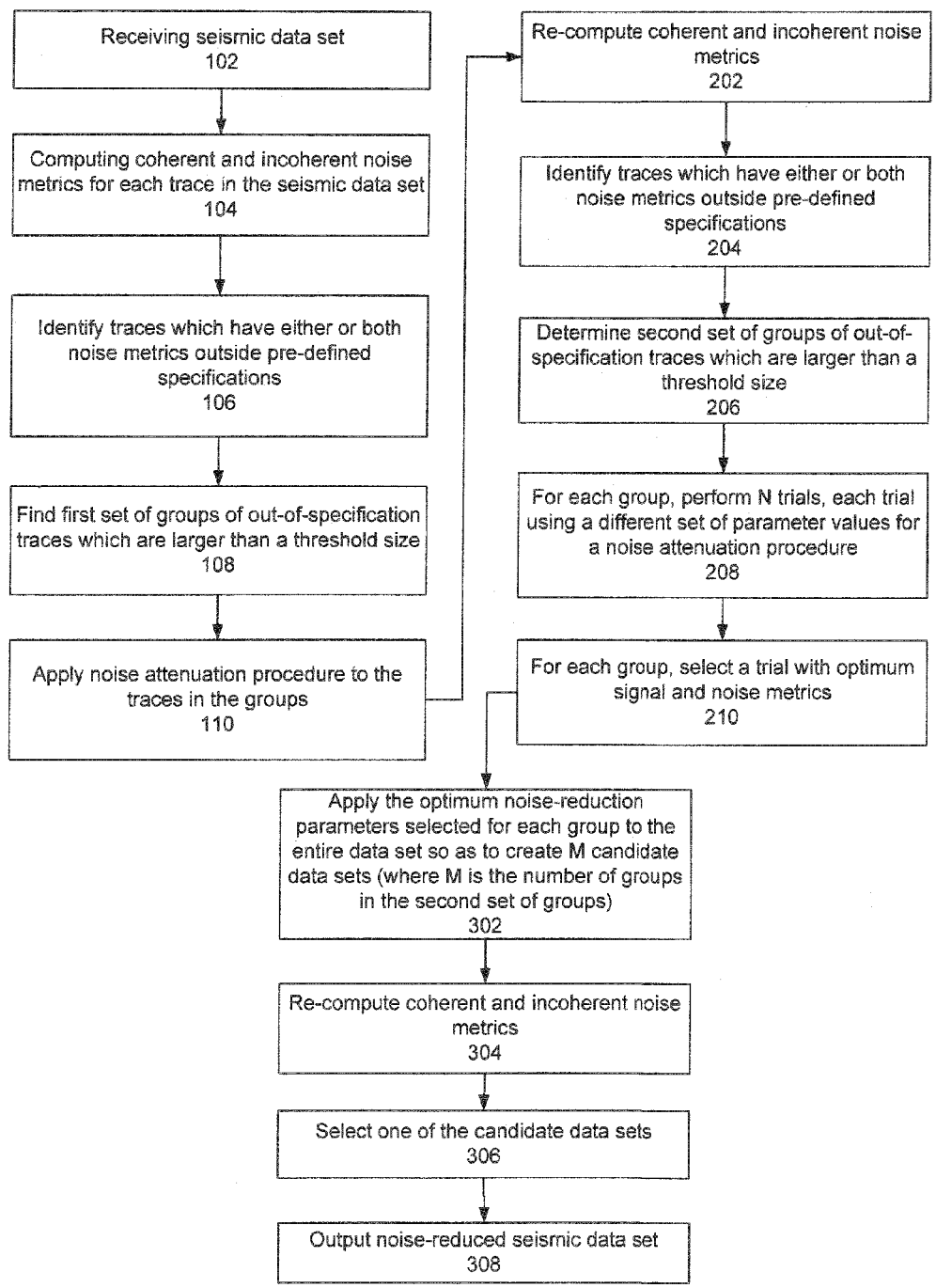
FIG. 3    300

Before Demultiple

After Demultiple

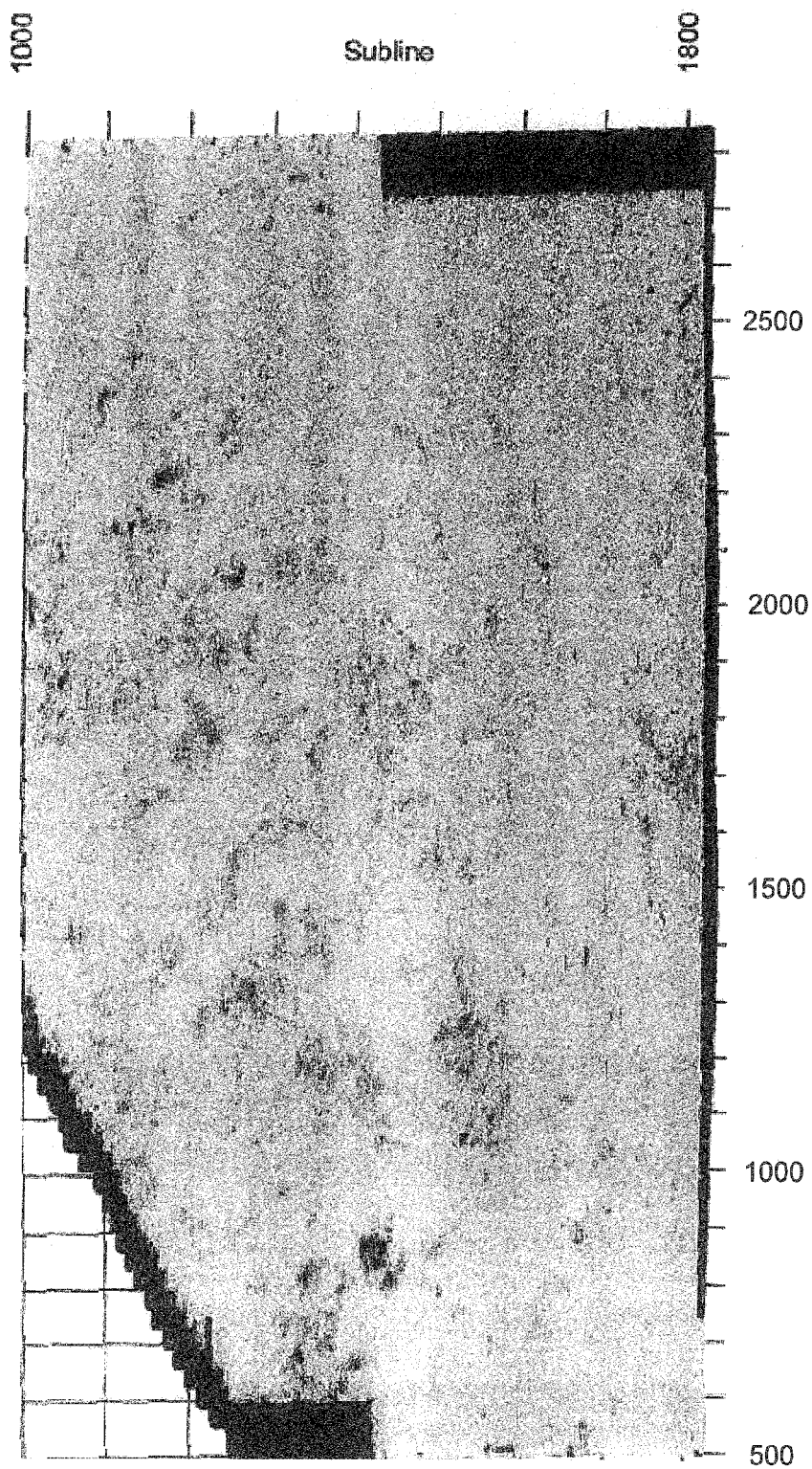

After Demultiple

Post-stack Raw

Post-stack NS3D Applied

METHODS AND APPARATUS FOR AUTOMATED NOISE REMOVAL FROM SEISMIC DATA

BACKGROUND

In the oil and gas industry, geophysical prospecting is commonly used to aid in the search for and evaluation of subterranean formations. Geophysical prospecting techniques yield knowledge of the subsurface structure of the earth, which is useful for finding and extracting valuable mineral resources, particularly hydrocarbon deposits such as oil and natural gas.

One technique of geophysical prospecting is a seismic survey. In a seismic survey, an acoustic wave, referred to as a seismic signal, is generated by one or more seismic energy sources. Terrestrial seismic energy sources may include, for example, shots of buried dynamite or seismic air guns. Marine seismic energy sources may include, for example, air guns, water guns, or marine vibrators.

The seismic signal propagates into the geological strata of the earth and reflects off sub-surface features, referred to as seismic reflectors, which present varying acoustic impedances. Such seismic reflectors are typically interfaces between subterranean formations having different elastic properties which lead to differences in acoustic impedance at the interfaces.

The reflected waves may be received by multiple seismic sensors, referred to as receivers. Land seismic sensors may include, for example, geophones, while marine seismic sensors may include, for example, geophones and hydrophones. Each sensor is configured to convert the wave information to electrical signals, referred to as seismic data. In a typical configuration, the sensors may be configured in a two-dimensional (2D) array such that three-dimensional (3D) seismic data (seismic volumes) may be obtained. The seismic data may be recorded and subsequently processed to yield information relating to the geologic structure and properties of the subterranean formations and their potential hydrocarbon content.

One challenge in processing the seismic data to obtain useful information about the geological structure is due to the presence of noise in the seismic data. The noise generally includes both incoherent and coherent noise (often in the form of multiples). The attenuation of incoherent and coherent noise in seismic data is one of the most labor-intensive and challenging aspects of seismic data processing.

BRIEF DESCRIPTION OF THE DRAWINGS

FIG. 1 is a flow chart of a computer-implemented method for noise removal from seismic data in accordance with an embodiment of the invention.

FIG. 2 is a flow chart of a computer-implemented method for noise removal from seismic data in accordance with another embodiment of the invention.

FIG. 3 is a flow chart of a computer-implemented method for noise removal from seismic data in accordance with another embodiment of the invention.

FIGS. 5A and 5B show the RMS amplitude of the primary wavelet before and after coherent noise removal, respectively, for example seismic data in accordance with an embodiment of the invention.

Note that the figures provided herewith are not necessarily to scale. They are provided for purposes of illustration to ease in the understanding of the presently-disclosed invention.

DETAILED DESCRIPTION

The present disclosure provides methods and apparatus for noise removal from seismic data. The methods and apparatus may be applied to seismic data obtained from either a land-based or a marine-based seismic data acquisition system.

Conventional techniques for noise removal from seismic data are highly "manual" in that they require a large amount of input, judgment, and decisions on the part of the user. For example, many of the most labor intensive tasks involve the testing and application of many parameterized versions of noise-attenuating algorithms to determine a set of parameters which is effective in removing the noise.

Advantageously, the methods and apparatus disclosed herein may be implemented in a highly automated manner so as to eliminate or reduce the necessity for human intervention in the noise removal process. As described herein, this may be accomplished by effectively linking together the generation of noise attenuation (and primary preservation) metrics, the parameterization of the relevant noise attenuation procedures, and, in certain embodiments, a pre-specified stopping criterion or criteria.

FIG. 1 is a flow chart of a computer-implemented method 100 for noise removal from seismic data in accordance with an embodiment of the invention. This method 100 detects automatically areas of data which have metrics that are outside pre-defined specifications. The detected areas are then automatically targeted by the method 100 for noise attenuation.

Per block 102, a seismic data set may be received. The seismic data set may have been acquired using any of a variety of seismic data acquisition systems. In general, the seismic data set may have been acquired using one or more seismic sources and multiple seismic receivers (detectors). The seismic sources may be configured to generate "shots" of seismic energy, and the seismic receivers may be configured to record traces of the reflected seismic waves due to the shots. Each trace may correspond to a seismic record for an individual shot-receiver path. The seismic data set may be obtained from a three-dimensional seismic survey, for example.

Figure 9:
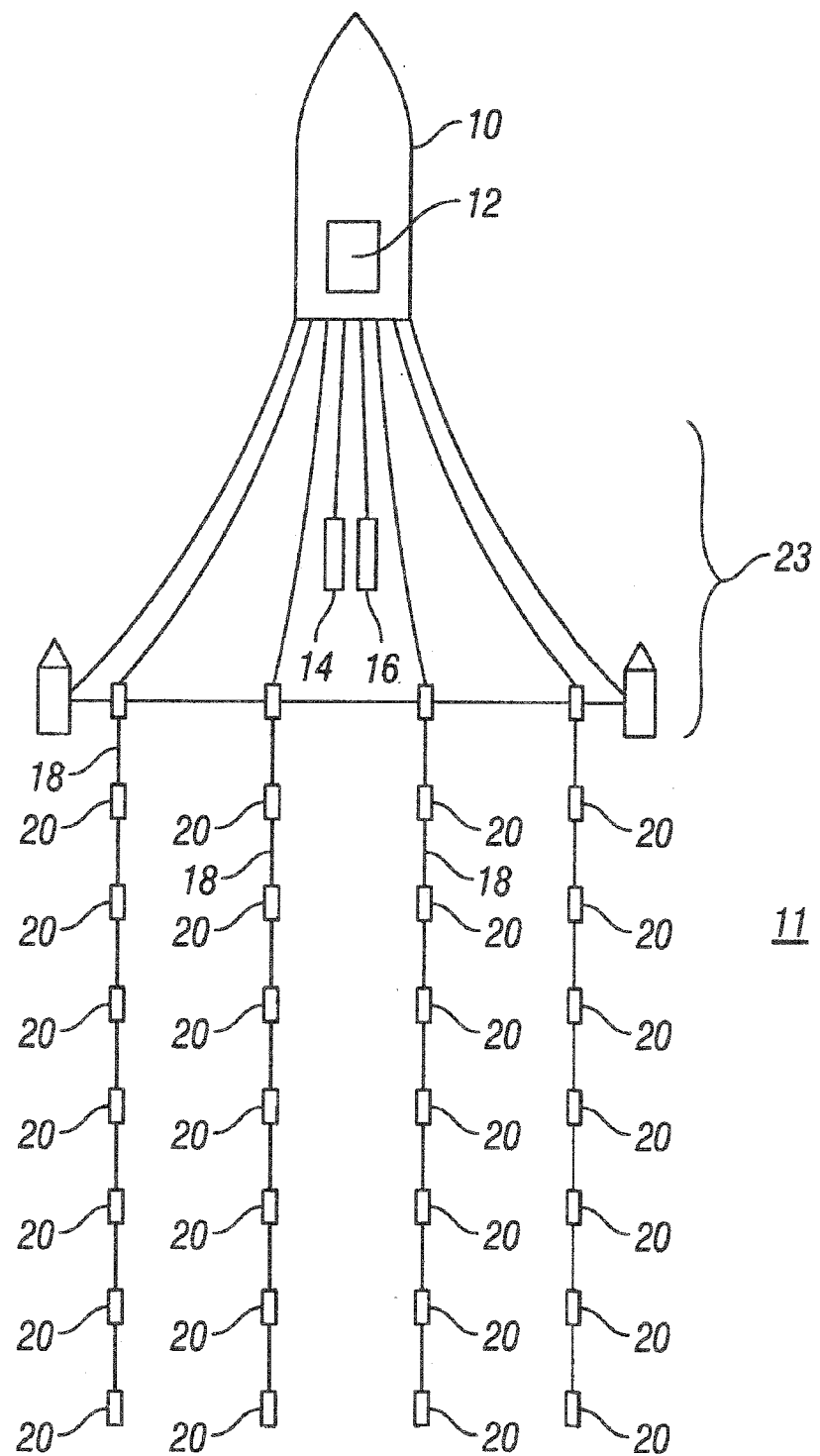
FIG. 9 shows a marine seismic data acquisition system in accordance with an embodiment of the invention.

One example of a seismic data acquisition system 11 is shown in FIG. 9 in accordance with an embodiment of the invention. As shown, a marine vessel 10 may be configured to tow seismic sources 14/16 and streamers 18 which include a plurality of wave-field sensors 20. The sensors 20 may measure and record one or more wave-fields over time. The streamers 18 may be maintained in their relative lateral and longitudinal positions with respect to the vessel 10 using towing equipment 23. It is contemplated that a wide variety of towing equipment may be employed, both currently available and to be developed. A data recording system 12 on the vessel may be used to record time-dependent signals obtained by the array of sensors 20 being towed by the vessel 10. Note that the methods and apparatus for automated noise removal described herein may be applied to seismic data obtained by various kinds of seismic data acquisition systems, including both land-based and marine-based acquisition systems.

Per block 104, coherent and incoherent noise metrics may be computed for the seismic data set, for example, using a set of time and depth windows. Different noise metrics may be used in accordance with different embodiments of the present invention.

The coherent noise metric may be computed, for example, using a cross correlation, or a root mean square (RMS) amplitude map, or a semblance-based multiple metric, or other coherent noise metrics.

The cross correlation may be, for example, between a raw model [Rm] and an adapted model [Am], or between the adapted model [Am] and the input data [I]. The input data relates to the data detected by the receivers. The raw model refers to a model of the coherent noise from an algorithm used to predict the noise. The adapted model refers to the raw model after application of an adaptive filter which minimizes the misfit between the raw model and the input data within a given time and space window. The output data refers to the result of subtracting the adapted model from the input data. In equation form, [O]=[I]−[Am]. The output data is a modified version of the data detected by the receivers.

The RMS amplitude map may be, for example, on a wavelet estimated using the output data [O] and the input data [I]. Alternatively, the RMS amplitude map may be, for example, an autocorrelation using the output data [O] and the input data [I].

The semblance-based metric may be computed at every CMP (common mid-point) with a multitude of (for example, one hundred) velocity scans. The velocity scans represent a range of velocities centered on a 0% variance of the guide function. The semblance traces may be separated into primary (P) and multiple (M) velocities. These separated semblance scans may then be stacked. To evaluate the difference in multiple (i.e. coherent noise) attenuation between the processing steps, an attribute M/(P+M) may be computed. The greater the decrease in the computed attribute, the better the multiple suppression (i.e. the better the attenuation of the coherent noise).

The incoherent noise metric may be computed, for example using a multiple coherence function, or other incoherent noise metrics. While a coherence function provides a measure of the extent to which an output signal may be predicted from an input signal, a multiple coherence function may provide a measure of the extent to which multiple output signals may be predicted from an input signal.

Per block 106, traces which have either coherent or incoherent noise metrics, or both noise metrics, outside pre-defined specifications may be identified. Note that this identification of out-of-specification traces may be performed while the noise metrics are being computed (i.e. it does not have to wait until after all the noise metrics are computed). The pre-defined specifications may involve, for example, a first threshold for the coherent noise metric and a second threshold for the incoherent noise metric. Those traces with either metric (or both metrics) exceeding the associated threshold may be identified as an out-of-specification trace.

Per block 108, a first set of groups of out-of-specification traces which are larger than a first threshold size may be found. The detection of these groups may be performed by scanning the volume of traces with the associated out-of-specification identification data. Groups of neighboring out-of-specification traces may be detected during the scan, and sizes of the detected groups may be determined. The group size may be defined, for example, by the number of out-of-specification traces within the group. Groups whose size is greater than the first threshold size may be identified, while groups whose size is smaller than the first threshold size may be ignored. These identified groups may be used to form the first set of groups.

Per block 110, a noise attenuation procedure may be applied to the traces in each group of the first set of groups. Note that the noise attenuation procedure may be advantageously applied to the groups and not the entire volume of the seismic data. This substantially reduces an amount of processing time required and also focuses the noise attenuation on the noisiest portions of the data. The noise attenuation procedure may apply a first technique to reduce the coherent noise and a second technique to reduce the incoherent noise in the first set of groups. For this step, the noise attenuation procedure may use default parameterizations for the first and second techniques.

The technique to reduce the coherent noise may involve, for example, surface related multiple elimination, and/or other procedures to remove coherent noise. In one embodiment, coherent noise may be removed using a sequence including shot tau-p deconvolution, surface related multiple elimination, receiver tau-p deconvolution, and a radon demultiple technique. Other sequences may be used in other embodiments.

The technique to reduce the incoherent noise in a trace may involve, for example, predicted deconvolution, such as used in a technique referred to as fx deconvolution. The predicted deconvolution may be applied to separate a predicted factor of the trace based on a neighboring trace from an unpredicted factor of the trace relating to the incoherent noise to be removed.

Finally, per block 112, the noise-reduced seismic data set may be output. Advantageously, the method 100 of FIG. 1 reduces the noise in the seismic data in an automated and tailored manner, without unnecessarily applying a noise attenuation procedure to the entire data set.

FIG. 2 is a flow chart of a computer-implemented method 200 for noise removal from seismic data in accordance with another embodiment of the invention. As seen, the method 200 begins with blocks 102 through 110 from FIG. 1. However, instead of outputting a noise-reduced data set after those steps, the method 200 continues with block 202.

Per block 202, the coherent and incoherent noise metrics may be re-computed for traces in the first set of groups. In one embodiment, these noise metrics may be the same as the noise metrics used per block 104 described above.

Per block 204, the traces in the first set of groups which still have either coherent or incoherent noise metrics, or both noise metrics, outside pre-defined specifications may be identified. Note that this identification of out-of-specification traces may be performed while the noise metrics are being computed (i.e. it does not have to wait until after all the noise metrics are computed). The pre-defined specifications may involve, for example, a first threshold for the coherent noise metric and a second threshold for the incoherent noise metric. These thresholds may be the same as the thresholds used per block 106 described above. Those traces with either metric (or both metrics) exceeding the associated threshold may be identified as an out-of-specification trace.

Per block 206, a second set of groups of out-of-specification traces which are larger than a second threshold size may be found. The detection of these groups may be performed by scanning the traces in the first set of groups (to which noise attenuation was applied per block 110) with the associated out-of-specification identification data determined per block 204. Similar to block 110, groups of neighboring out-of-specification traces may be detected during the scan, and sizes of the detected groups may be determined. The group size may be defined, for example, by the number of out-of-specification traces within the group. Groups whose size is greater than the second threshold size may be identified, while groups whose size is smaller than the second threshold size may be ignored. These identified groups may be used to form the second set of groups. In one embodiment, the second threshold size may be the same as the first threshold size used per block 108 described above.

Per block 208, for each group in the second set of groups, multiple trials may be performed. The number of trials may be denoted by the variable N. Each trial uses a different set of parameter values for a noise attenuation procedure, and applies the parameterized noise attenuation procedure to the traces in a group. In other words, each group of traces may have N noise attenuation procedures, each with different parameters, performed upon it. Hence, if there are M groups in the second set of groups, then M×N trial data sets may be generated in this step, each trial data set being associated with a specific parameterization of the noise attenuation procedure and a specific group in the second set of groups.

In accordance with one embodiment of the invention, the number of trials N for each group may be as follows. Let n be the number of parameters to be varied, and let $q_i$ represent a number of possible values for parameter i, where i=1, 2, 3, ... n. In this case, the number of trials N for each group may be equal to the product $q_1 q_2 q_3 \ldots q_{n-1} q_n$. As this number has the potential to become very large, the number of parameters and the possible values of each parameter may be limited in order to limit N to a manageable number.

Per block 210, for each group in the second set of groups, a trial with optimum signal and noise metrics may be selected. For example, the trial with a greatest signal-to-noise ratio may be selected from the N trials for each group. If there are M groups in the second set of groups, then M trials with optimum signal and noise metrics may be selected, one trial for each group.

Per block 212, the optimum noise-reduction parameters selected for each group may be applied to the traces in that group. In other words, the parameters from the selected trial for a group are applied to further attenuate the noise of that group.

Per block 214, blending may be applied between neighboring regions to which different noise attenuation procedures have been applied. For example, a first region may be a group of traces to which a first parameterization of a noise attenuation procedure has been applied, and a second region (which may be abutting the first region) may include traces to which the noise attenuation procedure has not been applied. As another example, the first region may be a group of traces to which a first parameterization of the noise attenuation procedure has been applied, and the second region may be a neighboring group of traces to which a second parameterization of the noise attenuation procedure has been applied. As another example, the first region may be a group of traces to which a single noise attenuation procedure has been applied (for example, per block 110), and the second region may be a neighboring group of traces to which two noise attenuation procedures have been applied (for example, per block 110 and blocks 208/210). The blending may be performed by applying a tapering algorithm to traces in a vicinity of a boundary between the first and second regions.

Finally, per block 216, the noise-reduced seismic data set may be output. Advantageously, the method 200 of FIG. 2 reduces the noise in the seismic data in an automated and tailored manner, without unnecessarily applying a noise attenuation procedure to the entire data set. While the method 100 of FIG. 1 calculates noise metrics for the entire data set and selectively applies noise attenuation to a first set of noisy groups, the method 200 of FIG. 2 goes further by recalculating the noise metrics and selectively applying further noise attenuation to a second set of noisy groups. As described above, the further noise attenuation may be accomplished by selecting noise-reduction parameters that are determined to achieve optimum signal and noise metrics on a group-by-group basis.

FIG. 3 is a flow chart of a computer-implemented method 300 for noise removal from seismic data in accordance with another embodiment of the invention. As seen, the method 300 begins with blocks 102 through 210 of FIG. 2. However, instead of applying the optimum noise-reduction parameters for each group to that group alone per block 212, the method 300 applies the optimum noise-reduction parameters for each of the M groups in the second set of groups to the entire data set per block 302. This creates M candidate data sets, each candidate data set using the optimum noise-reduction parameters from a different group in the second set of groups.

Per block 304, the coherent and incoherent noise metrics may be re-computed for traces in each of the candidate data sets. In one embodiment, these noise metrics may be the same as the noise metrics used per block 104 described above.

Per block 306, one of the candidate data sets may be selected to be used. In one embodiment, the candidate data set may be selected by an operator as the noise-reduced data set that appears the most beneficial even if some groups of traces remain outside the predefined specifications. In another embodiment, a computer-implemented method may be used to select the candidate data set based on signal and noise metrics.

Figure 4A:
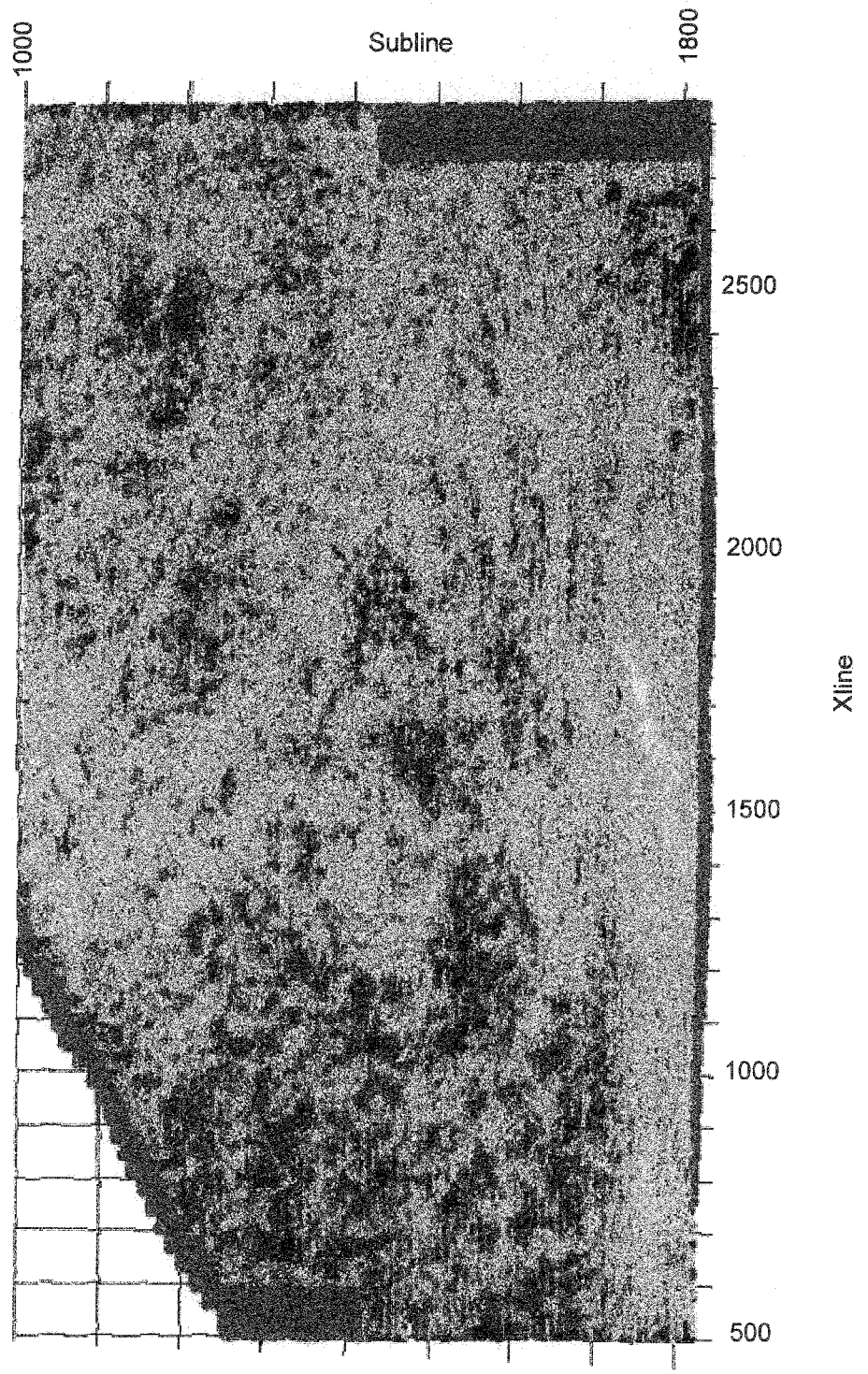
FIGS. 4A and 4B show the root mean square (RMS) amplitude of short period multiple energy before and after coherent noise removal, respectively, for example seismic data in accordance with an embodiment of the invention.
Figure 4B:
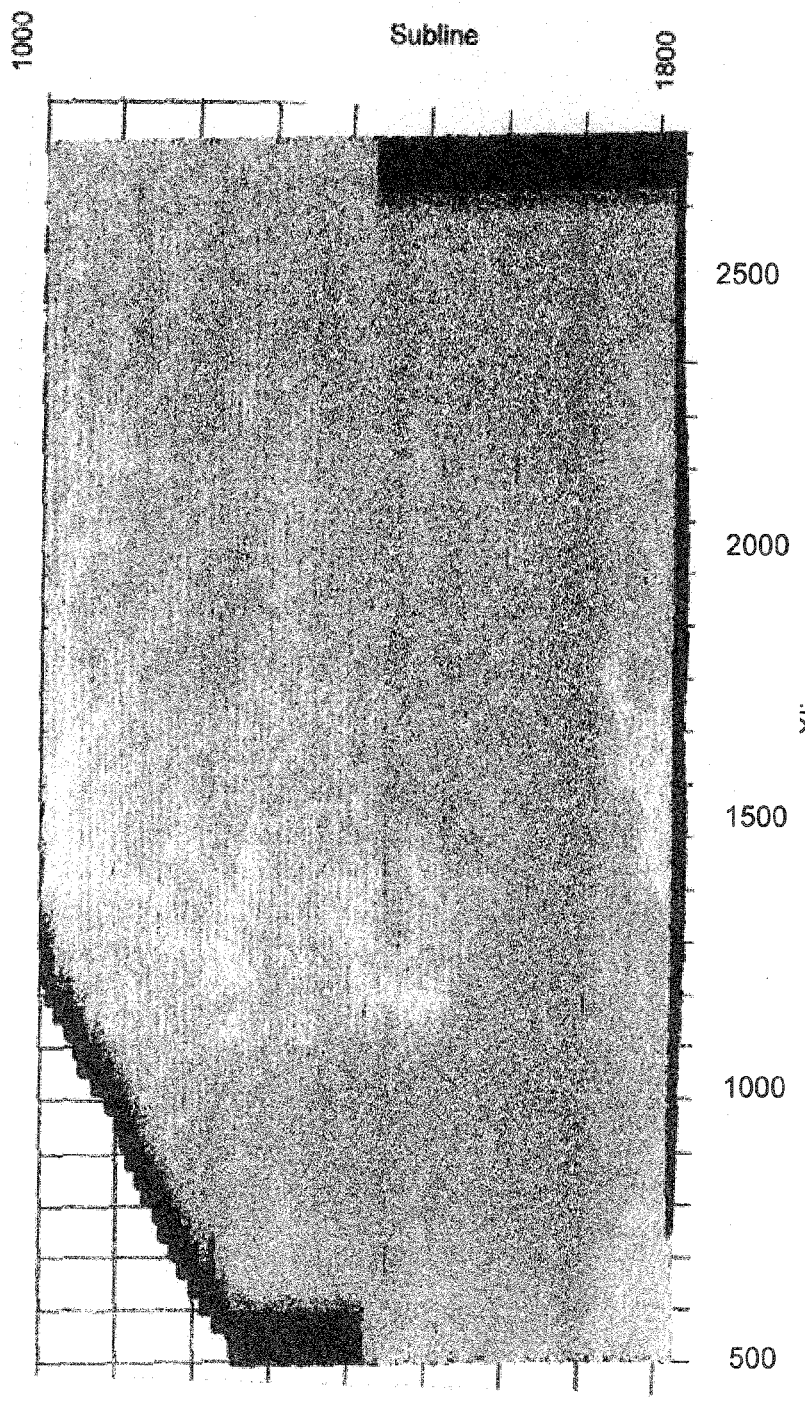

An illustrative example depicting the effectiveness of coherent noise removal from actual seismic data is now described in relation to FIGS. 4A and 4B. First, in order to focus on the coherent noise in the data, a short period multiple metric procedure is used to perform autocorrelations on a number of (for example, up to five) exclusive time gates dependent on the trace length of the data. With a 4 millisecond (ms) sampling rate, the lead and lag times for the autocorrelations are set to 40 ms and 400 ms, respectively, generating a 440 ms autocorrelation trace. For each autocorrelation generated within each time gate, the first 40 ms on either side of the lag amplitude is considered to contain the primary wavelet, while the remaining 360 ms is considered to consist of mainly short period multiple energy.

FIGS. 4A and 4B show the computed RMS amplitude of the short period multiple energy from the autocorrelation of the first time gate before and after coherent noise removal, respectively, in accordance with an embodiment of the invention. The RMS amplitude shown in FIG. 4A shows darker areas of higher coherent noise. As seen in FIG. 4B, the coherent noise removal is effective in substantially reducing the coherent noise.

Figure 5B:
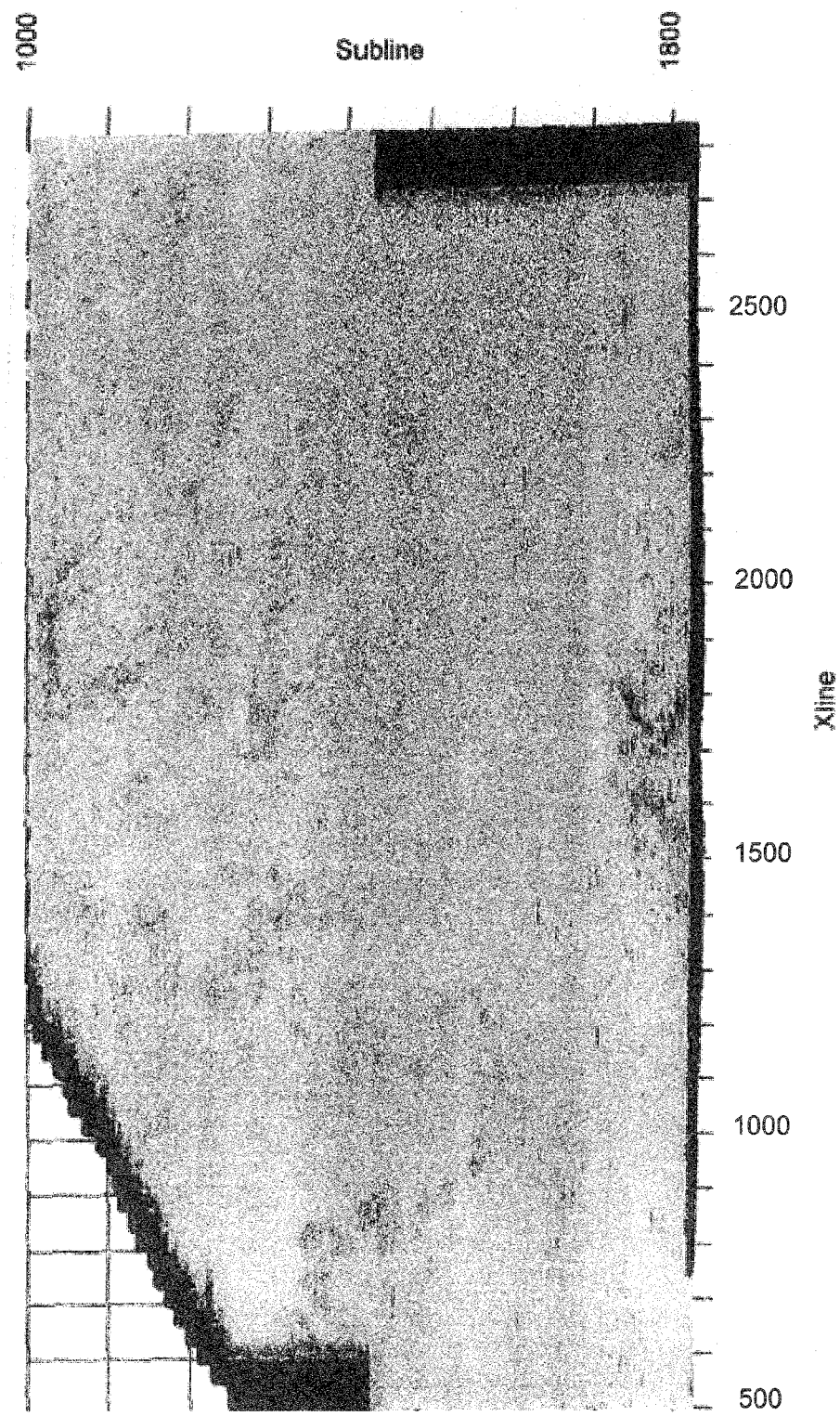

FIGS. 5A and 5B show the computed RMS amplitude of the primary wavelet from the autocorrelation of the first time gate before and after coherent noise removal, respectively, in accordance with an embodiment of the invention. As seen by comparing FIG. 5A with FIG. 5B, the primary wavelet shows little difference before and after the coherent noise removal.

This advantageously shows that the primary seismic data signal is substantially unaffected by the coherent noise removal.

Figure 6A:
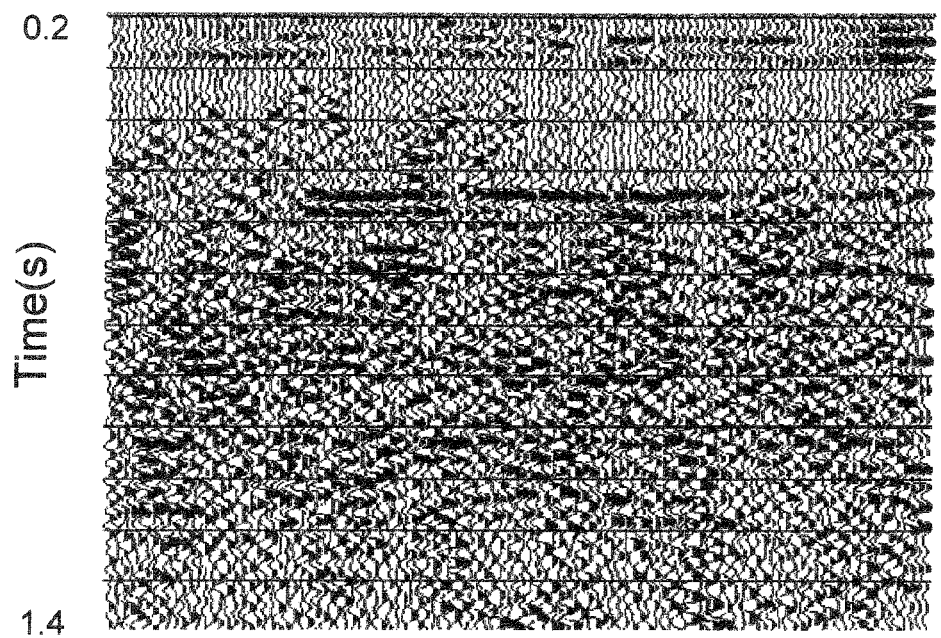
FIGS. 6A and 6B show example post-stack seismic data before and after incoherent noise removal, respectively, in accordance with an embodiment of the invention.
Figure 6B:
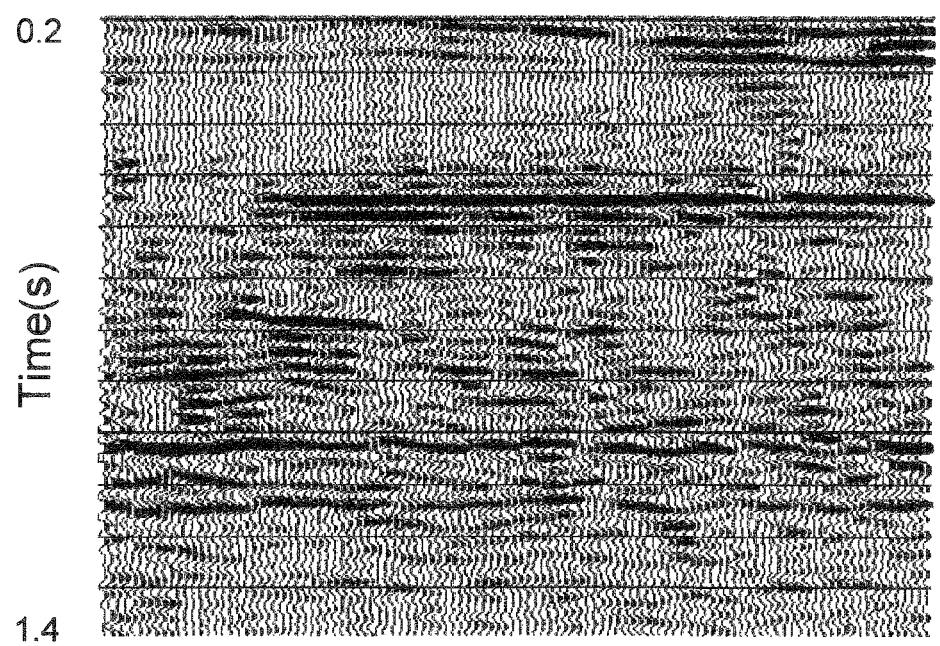

FIGS. 6A and 6B show example post-stack seismic data before and after incoherent noise removal, respectively, in accordance with an embodiment of the invention. The raw (before incoherent noise removal) post-stack data before incoherent noise removal (Raw) shown in FIG. 6A is substantially noisier than the post-stack data after incoherent noise removal (NS3D Applied) shown in FIG. 6B. In this example, the incoherent noise removal involves using a three-dimensional weighted slant-stack which adds amplitudes across a dipping plane.

Figure 7:
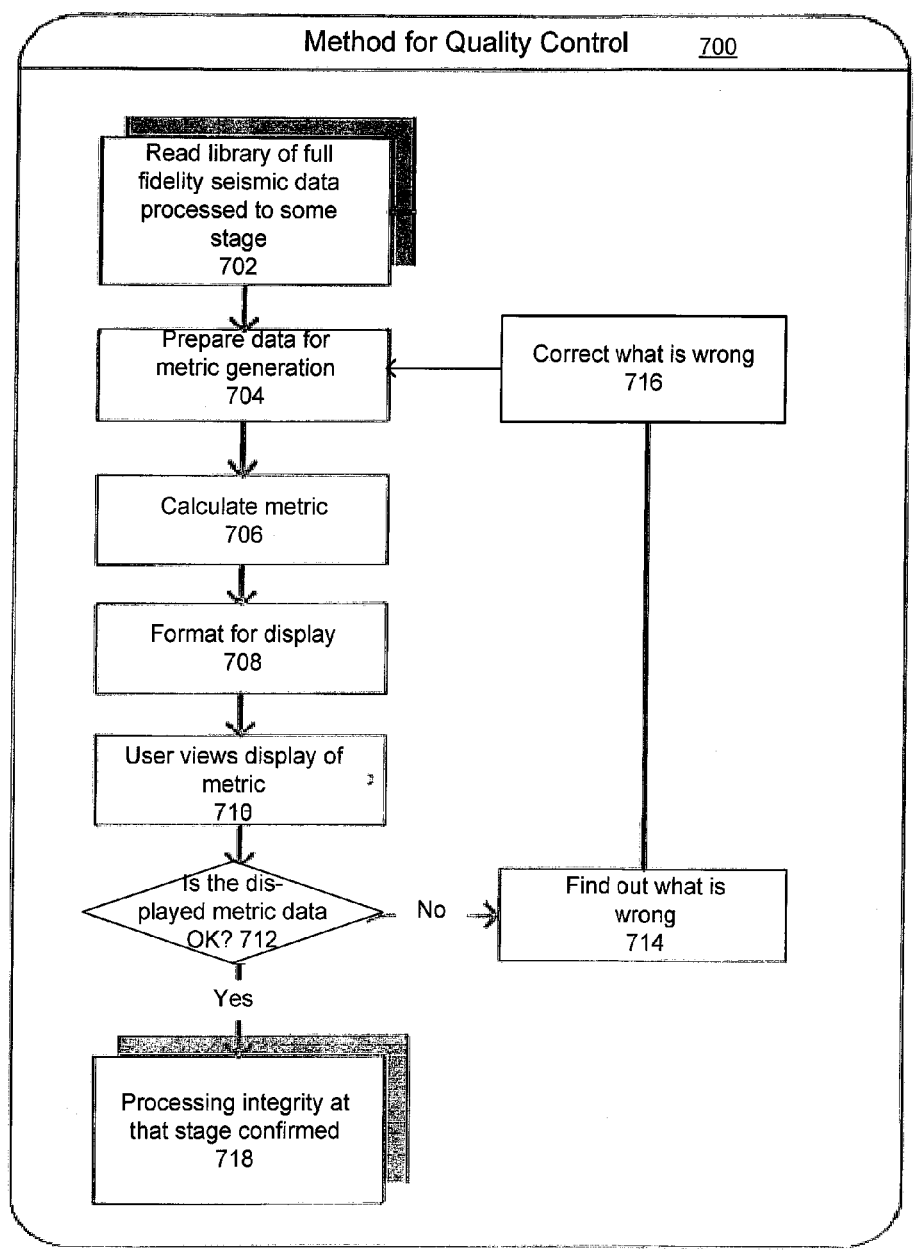
FIG. 7 is a flow chart of a method for quality control for processing seismic data to a specified stage in accordance with an embodiment of the invention.

FIG. 7 is a flow chart of a computer-implemented method 700 of quality control for processing seismic data to a specified stage in accordance with an embodiment of the invention. Per block 702, a library of full fidelity seismic data may be processed to a specified stage. The stage may vary depending on where in the seismic data processing this quality control method 700 is being applied. In one embodiment, the seismic data may be processed through a noise removal stage. Per block 704, the seismic data may be prepared for metric generation, and metric calculation may be performed per block 706. In one embodiment, coherent and incoherent noise metrics may be calculated. Per block 708, the calculated metric data may be formatted for display, and a user (operator) may view the display of the metric data per block 710.

Per block 712, a determination may be made as to whether or not the displayed metric data (for example, the noise metric data) is satisfactory (OK). If the displayed metric data is OK, then the method may confirm that processing integrity to that stage per block 718. On the other hand, if the displayed metric data is not OK, then the computer-implemented method may determine (find) what is wrong with the data processed to that stage per block 714. For example, groups of traces that have a noise metric outside a preferred range may be identified. Per block 716, a procedure may be performed to correct what was found to be wrong. Thereafter, the computer-implemented method 700 may loop back to block 704 where the data is prepared for the metric data to be re-generated. The method 700 is completed once the metric data is deemed OK per block 712 and the processing integrity at that stage is confirmed per block 718.

Figure 8:
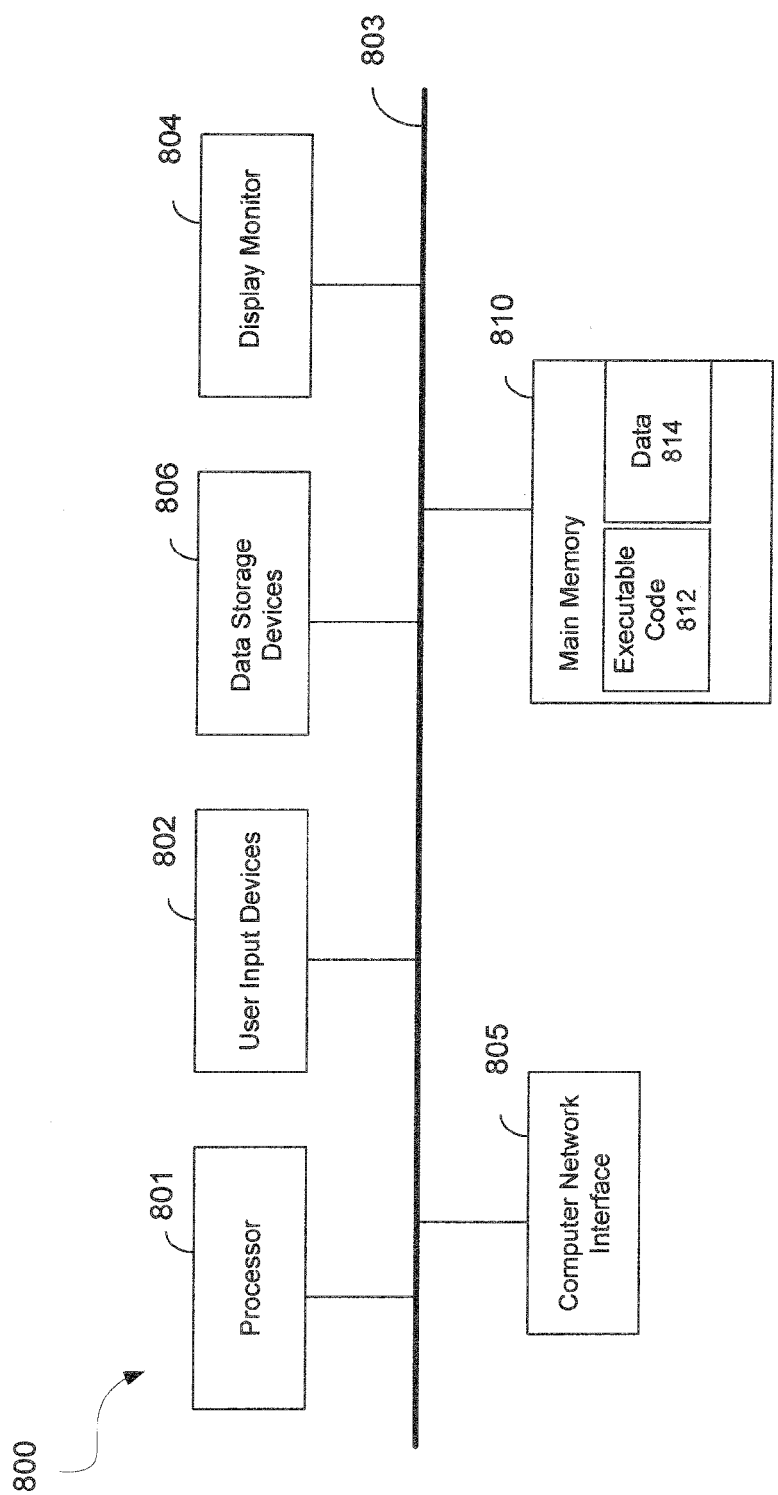
FIG. 8 is a diagram depicting components of an example computer apparatus which may be configured to execute methods disclosed herein in accordance with an embodiment of the invention.

FIG. 8 is a diagram depicting components of an example computer apparatus 800 which may be configured to execute methods disclosed herein in accordance with an embodiment of the invention. This figure shows just one example of a computer which may be used to perform the data processing methods described herein. Many other types of computers may also be employed, such as multi-processor computers, server computers, cloud computing via a computer network, and so forth.

The computer apparatus 800 may include a processor 801, such as those from the Intel Corporation of Santa Clara, Calif., for example. The computer apparatus 800 may have one or more buses 803 communicatively interconnecting its various components. The computer apparatus 800 may include one or more user input devices 802 (e.g., keyboard, mouse), a display monitor 804 (e.g., liquid crystal display, flat panel monitor, cathode ray tube), a computer network interface 805 (e.g., network adapter, modem), and a data storage system that may include one or more data storage devices 806 which may store data on a hard drive, optical disk, semiconductor-based memory, or other tangible non-transitory computer-readable storage media 807, and a main memory 810 which may be implemented using random access memory, for example.

In the example shown in this figure, the main memory 810 includes instruction code 812 and data 814. The instruction code 812 may comprise computer-readable program code (i.e., software) components which may be loaded from the tangible non-transitory computer-readable medium 807 of the data storage device 806 to the main memory 810 for execution by the processor 801. In particular, the instruction code 812 may be configured to perform the data processing methods described herein.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc. In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined by the following claims, which are to be construed in accordance with established doctrines of claim interpretation.

What is claimed is:

1. A computer-implemented method for automated noise removal from seismic data, the method comprising:
   receiving a seismic data set comprising a plurality of traces obtained from seismic measurements;
   computing noise metrics for the seismic data set using a set of time and depth windows;
   scanning the seismic data set to determine a first set of groups, wherein each group in the first set comprises at least a first minimum number of neighboring traces for which at least one of the noise metrics is outside a predefined specification; and
   applying noise attenuation to the traces in the first set of groups;
   computing the noise metrics for each noise-attenuated trace in the first set of groups;
   scanning the noise-attenuated traces in the first set of groups to determine a second set of groups, wherein each group in the second set comprises a grouping of at least a second minimum number of neighboring noise-attenuated traces for which at least one of the noise metrics is outside the predefined specification; and
   applying a further noise-reducing process to the noise-attenuated traces in the second set of groups.

2. The computer-implemented method of claim 1, wherein the seismic data set is obtained from a three-dimensional seismic survey.

3. The computer-implemented method of claim 1, wherein the neighboring traces are neighbors to each other in terms of time or depth.

4. The computer-implemented method of claim 1, wherein the noise metrics comprise coherent and incoherent noise metrics.

5. The computer-implemented method of claim 4, wherein the coherent and incoherent noise metrics are relative to a signal strength.

6. The computer-implemented method of claim 4, wherein an autocorrelation function is used to compute the coherent noise metric.

7. The computer-implemented method of claim 4, wherein a multiple coherence function is used to compute the incoherent noise metric.

8. A computer-implemented method for automated noise removal from seismic data, the method comprising:
receiving a seismic data set comprising a plurality of traces obtained from seismic measurements;
computing noise metrics for the seismic data set using a set of time and depth windows, wherein the noise metrics comprise coherent and incoherent noise metrics, and wherein the noise attenuation for the coherent noise in a trace comprises surface related multiple elimination;
scanning the seismic data set to determine a first set of groups, wherein each group in the first set comprises at least a first minimum number of neighboring traces for which at least one of the noise metrics is outside a predefined specification; and
applying noise attenuation to the traces in the first set of groups.

9. A computer-implemented method for automated noise removal from seismic data, the method comprising:
receiving a seismic data set comprising a plurality of traces obtained from seismic measurements;
computing noise metrics for the seismic data set using a set of time and depth windows, wherein the noise metrics comprise coherent and incoherent noise metrics, and wherein the noise attenuation for the incoherent noise in a trace comprises predicted deconvolution; and
scanning the seismic data set to determine a first set of groups, wherein each group in the first set comprises at least a first minimum number of neighboring traces for which at least one of the noise metrics is outside a predefined specification.

10. The computer-implemented method of claim 9, wherein the predicted deconvolution comprises separation of a predicted factor of the trace based on a neighboring trace from an unpredicted factor of the trace relating to the incoherent noise.

11. The computer-implemented method of claim 1, wherein the first minimum and the second minimum are a same number.

12. The computer-implemented method of claim 1, wherein the further noise-reducing process comprises:
applying a second noise-attenuation procedure N times with N parameter sets to generate N trials of further noise-attenuated traces for each group of the second set; and
selecting a trial of further noise-attenuated traces for each group of the second set.

13. The computer-implemented method of claim 12, wherein the further noise-reducing process further comprises:
applying, to each group in the second set, the second noise-attenuation procedure with the parameter set of the selected trial for the group; and
outputting a resultant noise-reduced seismic data set.

14. The computer-implemented method of claim 12, wherein the noise-reduction process further comprises:
applying the second noise-attenuation procedure M times to the seismic data set as a whole, each time with a parameter set of a different selected trial, so as to create M candidate data sets, where M is a number of groups in the second set;
selecting one of the M candidate data sets; and
outputting the selected candidate data.

15. An apparatus for acquiring seismic data and performing automated noise removal from the seismic data, the apparatus comprising:
a seismic data acquisition system for acquiring a seismic data set, the seismic data acquisition system comprising one or more seismic sources generating acoustic waves and a plurality of seismic receivers detecting the generated acoustic waves;
a data storage system configured to store computer-readable code and data,
a processor configured to execute the computer-readable code so as to modify the data,
computer-readable code configured to calculate noise metrics based on the detected acoustic waves using a set of time and depth windows for the seismic data set comprising a plurality of traces;
computer-readable code configured to determine a first set of groups, wherein each group in the first set comprises at least a minimum number of neighboring traces for which at least one of the noise metrics is outside a predefined specification; and
computer-readable code configured to apply noise attenuation to the traces in the first set of groups;
computer-readable code configured to compute the noise metrics for each noise-attenuated trace in the first set of groups;
computer-readable code configured to scan the noise-attenuated traces in the first set of groups to determine a second set of groups, wherein each group in the second set comprises a grouping of at least the minimum number of neighboring noise-attenuated traces for which at least one of the noise metrics is outside the predefined specification; and
computer-readable code configured to apply a further noise-reducing process to the noise-attenuated traces in the second set of groups.

16. The apparatus of claim 15, further comprising:
computer-readable code configured to apply a second noise-attenuation procedure N times with N parameter sets to generate N trials of further noise-attenuated traces for each group of the second set;
computer-readable code configured to select a trial of further noise-attenuated traces for each group of the second set;
computer-readable code configured to apply, to each group of the second set, the second noise-attenuation procedure with the parameter set of the selected trial for the group; and
computer-readable code configured to output a resultant noise-reduced seismic data set.

17. The apparatus of claim 15, further comprising:
computer-readable code configured to apply the second noise-attenuation procedure M times to the seismic data set as a whole, each time with a parameter set of a different selected trial, so as to create M candidate data sets, where M is a number of groups in the second set;
computer-readable code configured to select one of the M candidate data sets; and
computer-readable code configured to output the selected candidate data.

18. At least one tangible computer-readable storage medium with executable code stored thereon which, when executed by one or more processors, performs steps comprising:

controlling a seismic data acquisition system for acquiring a seismic data set, the seismic data acquisition system comprising one or more seismic sources generating acoustic waves and a plurality of seismic receivers detecting the generated acoustic waves;

receiving the seismic data set comprising a plurality of traces;

computing noise metrics based on the detected acoustic waves for the seismic data set using a set of time and depth windows, wherein the noise metrics comprise coherent and incoherent noise metrics, and wherein the noise attenuation for the coherent noise in a trace comprises surface related multiple elimination;

scanning the seismic data set to determine a first set of groups, wherein each group in the first set comprises at least a first minimum number of neighboring traces for which at least one of the noise metrics is outside a predefined specification; and applying noise attenuation to the traces in the first set of groups.

19. A method for seismic data acquisition and quality control processing of seismic data comprising:

controlling a seismic data acquisition system for acquiring a seismic data set, the seismic data acquisition system comprising one or more seismic sources generating acoustic waves and a plurality of seismic receivers detecting the generated acoustic waves;

receiving a seismic data set processed to a specified stage;

calculating a metric based on a detected acoustic wave for the seismic data set;

determining if the seismic data set is acceptable;

determining an aspect of the seismic data set to be corrected, correcting the aspect, and looping back to calculating the metric if the seismic data set is determined to be unacceptable; and confirming a processing integrity of the seismic data set as processed to the specified stage if the seismic data set is determined to be acceptable.

* * * * *